US012658157B2

(12) United States Patent
Wei et al.

(10) Patent No.: US 12,658,157 B2
(45) Date of Patent: Jun. 16, 2026

(54) DISPLAY PANEL AND DISPLAY TERMINAL

(71) Applicant: TCL CHINA STAR OPTOELECTRONICS TECHNOLOGY CO., LTD., Shenzhen (CN)

(72) Inventors: Caifeng Wei, Shenzhen (CN); Chunfang Qiu, Shenzhen (CN); Qiuxia Shi, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/023,167

(22) Filed: Jan. 15, 2025

(65) Prior Publication Data

US 2026/0080844 A1 Mar. 19, 2026

(30) Foreign Application Priority Data

Sep. 18, 2024 (CN) ......................... 202411303056.4

(51) Int. Cl.
*G09G 3/36* (2006.01)

(52) U.S. Cl.
CPC ... *G09G 3/3677* (2013.01); *G09G 2300/0426* (2013.01); *G09G 2310/0286* (2013.01)

(58) Field of Classification Search
CPC ......... G09G 3/3677; G09G 2300/0426; G09G 2310/0286
See application file for complete search history.

(56) References Cited

U.S. PATENT DOCUMENTS

| | | | | |
|---|---|---|---|---|
| 2007/0007557 | A1 | 1/2007 | Kwak | |
| 2022/0358892 | A1* | 11/2022 | Liu | G09G 3/3677 |
| 2024/0203359 | A1* | 6/2024 | Jo | G09G 3/3677 |
| 2024/0212548 | A1* | 6/2024 | Kim | G09G 3/3677 |

FOREIGN PATENT DOCUMENTS

| | | | |
|---|---|---|---|
| CN | 104103229 | A | 10/2014 |
| CN | 116343633 | A | 6/2023 |
| CN | 117475851 | A | 1/2024 |
| CN | 118506748 | A | 8/2024 |

OTHER PUBLICATIONS

Chinese Office Action issued in corresponding Chinese Patent Application No. 202411303056.4 dated Aug. 22, 2025, pp. 1-7.

* cited by examiner

*Primary Examiner* — Grant Sitta
(74) *Attorney, Agent, or Firm* — PV IP PC; Wei Te Chung

(57) ABSTRACT

Embodiments of this application provide a display panel and a display terminal. The display panel comprises M rows of pixels; and M cascaded gate drive circuits, each of the gate drive circuits being connected to a row of the pixels, and each of the gate drive circuits comprising a reset transistor. Gate electrodes of K reset transistors arranged successively are connected to a first metal wiring, gate electrodes of M−K reset transistors arranged successively are connected to a reset signal line, and the first metal wiring and the reset signal line are in a disconnection state, where M and K are positive integers, and K<M.

12 Claims, 7 Drawing Sheets

DISPLAY PANEL AND DISPLAY TERMINAL

CROSS-REFERENCE TO RELATED APPLICATION

The application claims priority and benefit of Chinese Patent Application No. 202411303056.4, filed on Sep. 18, 2024, the disclosure of which is incorporated herein by reference in its entirety.

TECHNICAL FIELD

The present application relates to the field of display technologies, and in particular, to a display panel and a display terminal.

BACKGROUND

The array substrate integrated gate drive (Gate on Array or Gate driver On Array, also referred to as GOA) circuit is a technology applied in Liquid Crystal Display (LCD) panels, and it can realize a function of line-by-line scan drive by integrating gate drive circuits at an array substrate. Each of the GOA units includes a reset transistor (Reset) to ensure that a gate signal is correctly reset to the initial state at the beginning of each frame, preparing for the drive of a new row of pixels.

In each GOA (Gate drive on Array) circuit with a plurality of clock signals (N CLKs), the first N GOA units are used for pre-charging, and there is no need for reset transistors. In the present process of the panel cutting, if each of the GOA units of finished panels comprises a reset transistor, it is necessary to re-cut a connection between a plurality of drain electrodes of the first N reset transistors and a signal line of a preset low voltage level, leading to a low cutting efficiency caused by an increasing number of cuts. In addition, the plurality of cuts can easily have an impact on other wirings, and then affect the yield rate of the panels after cutting.

SUMMARY

A display panel and a display terminal are provided in embodiments of the present application so as to at least address the technical issues of lower cutting efficiency and lower panel yield rate caused by the need to re-cut the connection between a plurality of drain electrodes of the N reset transistors and a signal line of a preset low voltage level.

In one aspect, a display panel provided in the embodiments comprises: M rows of pixels; and M cascaded gate drive circuits, each of the gate drive circuits being connected to a row of the pixels, and each of the gate drive circuits comprising a reset transistor. Gate electrodes of K reset transistors arranged successively are connected to a first metal wiring, gate electrodes of M−K reset transistors arranged successively are connected to a reset signal line, and the first metal wiring and the reset signal line are in a disconnection state. M and K are positive integers, and K<M.

In another aspect, an embodiment of the present application further provides a display device. The display device includes a display panel. The display panel includes: M rows of pixels; and M cascaded gate drive circuits, each of the gate drive circuits being connected to a row of the pixels, and each of the gate drive circuits comprising a reset transistor. Gate electrodes of K reset transistors arranged successively are connected to a first metal wiring, gate electrodes of M−K reset transistors arranged successively are connected to a reset signal line, and the first metal wiring and the reset signal line are in a disconnection state. M and K are positive integers, and K<M.

LIST OF THE REFERENCE NUMBERS

Figure 1:
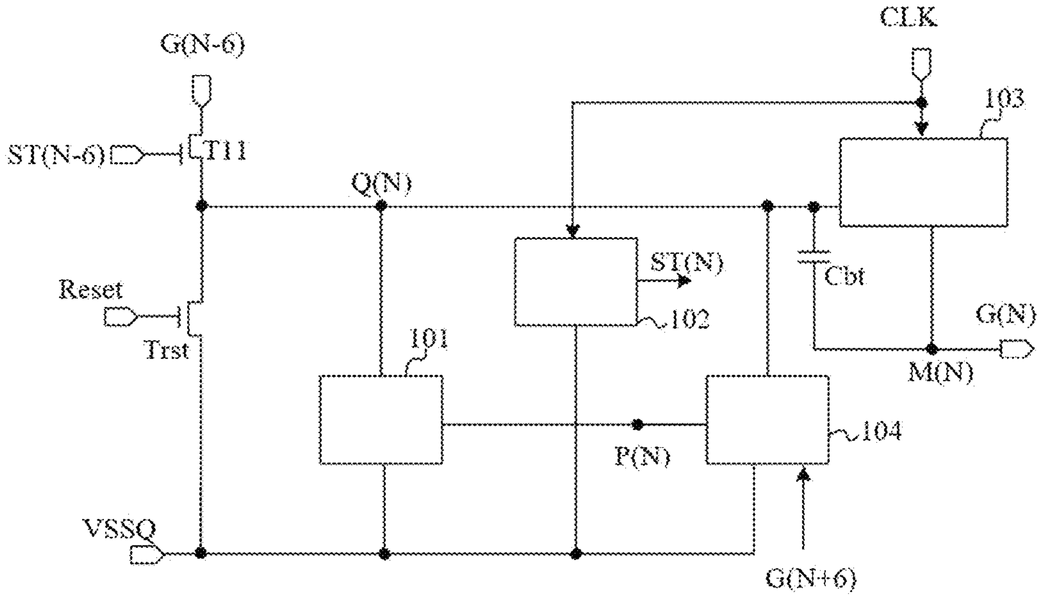
FIG. 1 is a schematic diagram of a GOA circuit according to an embodiment of the present application.

- 1, display terminal;
- 10, display panel; 11, first metal wiring; 12, reset signal line; 13, second metal wiring; 14, third metal wiring;
- 101, pull-down maintenance module; 102, down transmission module; 103, pull-up module; 104, pull-down module; and
- 20, terminal body.

DETAILED DESCRIPTION

The technical solutions in the embodiments of the present application will be described according to the accompanying drawings in the embodiments of the present application. The technical solutions described are intended only to explain and illustrate the ideas of the present application and should not be understood as limiting the scope of protection of the present application.

In the description of the present application, it should be understood that terms such as “center,” “longitudinal,” “transverse,” “length,” “width,” “thickness,” “upper,” “lower,” “front,” “rear,” “left,” “right,” “vertical,” “horizontal,” “top,” “bottom,” “inner,” “outer,” “clockwise,” and “counterclockwise” are used to indicate orientation or positional relationships based on the orientation or positional relationships shown in the drawings. In the description of the application, it needs to be understood that the orientation or position relationship indicated by the terms “center”, “longitudinal”, “transverse”, “length”, “width”, “thickness”, “up”, “down”, “front”, “back”, “left”, “right”, “vertical”, “horizontal”, “top”, “bottom”, “inside”, “outside”, “clockwise”, and “counterclockwise” are based on the orientation or position relationship shown in the attached drawings, and provided for convenience in describing the present application and simplifying the description, and not intended to indicate or imply that the referenced devices or elements must be constructed or operate in a specific orientation. Therefore, it cannot be understood as a limitation to the present application. Additionally, terms like "first" and "second" are used for descriptive purposes only and should not be understood as indicating or implying relative importance or the number of technical features referred to. Therefore, features defined with "first" and "second" may explicitly or implicitly include one or more of the described features. In the description of the present application, the term "a plurality of" means two or more, unless expressly and specifically qualified otherwise.

In the description of the present application, it should be explained that unless specifically stated otherwise, the terms "install," "link," and "connect" should be interpreted broadly. For example, it can use fixed connections, detachable connections, or integral connections, and it can refer to mechanical connections, electrical connections, or communicative connections, and it can be directly connected or indirectly connected via an intermediary medium, and they can refer to internal communication within two components or the interaction between two components. And the specific meanings of the above terms in the present applications can be understood based on the specific circumstances for a person of ordinary skill in the technical field.

The disclosure below provides a number of different embodiments or examples used to implement the different structures of the present application, and to simplify the disclosure of the present application, specific components and configurations of certain examples are described below. And, of course, the description is only for illustrative purposes, and the purpose is not to limit the present application. Additionally, reference numbers and/or letters in different examples can be repeatedly used so as to simplify and clarify the present application, and it does not indicate a relationship between the various embodiments and/or configurations as discussed. Additionally, examples of various specific processes and materials are provided in the present application, but the application of other processes and/or the use of other materials may be realized by a person of ordinary skill in the technical field.

In the accompanying drawings, components with the same structure are indicated by identical numerical references, while components with similar structures or functions are indicated by similar numerical references. Additionally, for ease of understanding and description, the dimensions and thicknesses of each component shown in the drawings are depicted arbitrarily, and a size and a thickness of each component are not defined in the present application.

The various embodiments provided in the present application are similar, and features in different embodiments can be combined with each other.

The order of the description of the following embodiments does not serve as a limitation on the preferred order of the embodiments.

Figure 2:
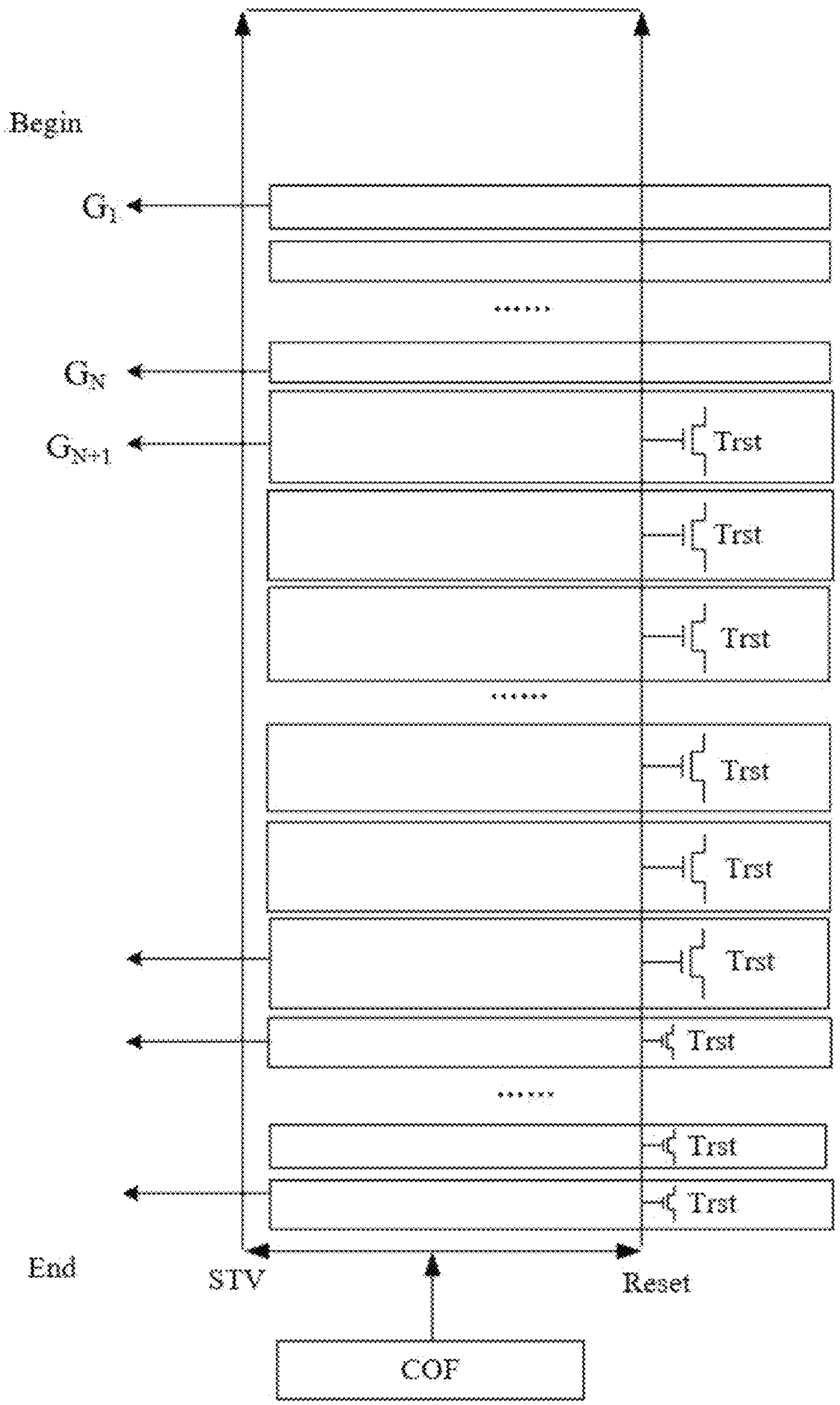
FIG. 2 is a schematic diagram illustrating the scanning of a GOA circuit in a display panel according to an embodiment of the present application.

Referring to FIG. 1 and FIG. 2, in a GOA circuit designed with a frame start signal (STV) and a reset signal (Reset), a reset Thin Film Transistor (TFT) will be provided on a reset wiring of a non-first-end GOA unit (that is, on GOA units other than a first-end GOA unit). The reset Thin Film Transistor (TFT), also referred to herein as a reset transistor (Trst) as shown in FIG. 1, is connected to a first node Q(N) and a low level voltage signal VSSQ (a preset low voltage level). A schematic diagram of an example GOA circuit is shown in FIG. 1, and the GOA circuit includes a pull-up control transistor T11, a down-transmission module 102, a pull-up module 103, a pull-down module 104, a pull-down maintenance module 101, and a bootstrap capacitor Cbt. An $(N-6)^{th}$ stage pass signal ST(N−6) and an $(N-6)^{th}$ stage scanning signal G(N−6) are inputted to the pull-up control transistor T11. The pull-up control transistor T11 is connected to the first node Q(N) so as to pull up a level of the first node Q(N). A low level voltage signal VSSQ and a clock signal CLK are inputted to the down-transmission module 102 so as to output an intra-level cascading stage pass signal ST(N). The clock signal CLK is inputted to the pull-up module 103, and the pull-up module 103 is electrically connected to the first node Q(N) and a second node M(N) so as to output a stage scanning signal G(N). The low level voltage signal VSSQ and an $(N+6)^{th}$ stage scanning signal G(N+6) are inputted to the pull-down module 104, and the pull-down module 104 is respectively electrically connected to the first node Q(N), the second node M(N), and a third node P(N) so as to pull down levels of the first node Q(N) and the stage scanning signal G(N). The low level voltage signal VSSQ is inputted to the pull-down maintenance module 101, and the pull-down maintenance module 101 is electrically connected to the first node Q(N) and the third node P(N) so as to maintain the level of the first node Q(N) at a level of the low level voltage signal VSSQ after the level of the first node Q(N) is pulled down by the pull-down module 104. The first terminal of the bootstrap capacitor Cbt is electrically connected to the first node Q(N), and the second terminal of the bootstrap capacitor Cbt is electrically connected to the second node M(N). The low level voltage signal VSSQ and a control signal Reset are inputted to the reset transistor Trst, and the reset transistor Trst is also electrically connected to the first node Q(N). A level of the first node Q(N) is pulled down to a level of the low level voltage signal VSSQ by the reset transistor Trst under a control of the control signal Reset.

It should be noted that each of the GOA circuit structures provided by the embodiments of the present application is only for a better understanding of the principle of the application and should not be understood as a limitation of the application. Additionally, the specific circuit connections within the aforementioned pull-down maintenance module 101, down-transmission module 102, pull-up module 103, and pull-down module 104 can be set according to actual demand, and the specific limitations are not imposed in the present application.

As shown in FIG. 2, the reset transistor (Trst) of a first-end GOA unit will usually be removed so as to prevent the first node Q(N) from being ineffectively charged. That is, the reset TFT transistor is not disposed at the first-end GOA unit of the conventional display panel. In this embodiment, the first end can be understood as follows: according to the row scanning sequence of the GOA circuit, the first N rows are a first group of cascaded gate drive circuits. N corresponds to the number of clock signals. That is, a group of N rows scans in a loop, and the first group of cascaded drive circuits can be defined as the first-end GOA unit.

Figure 3:
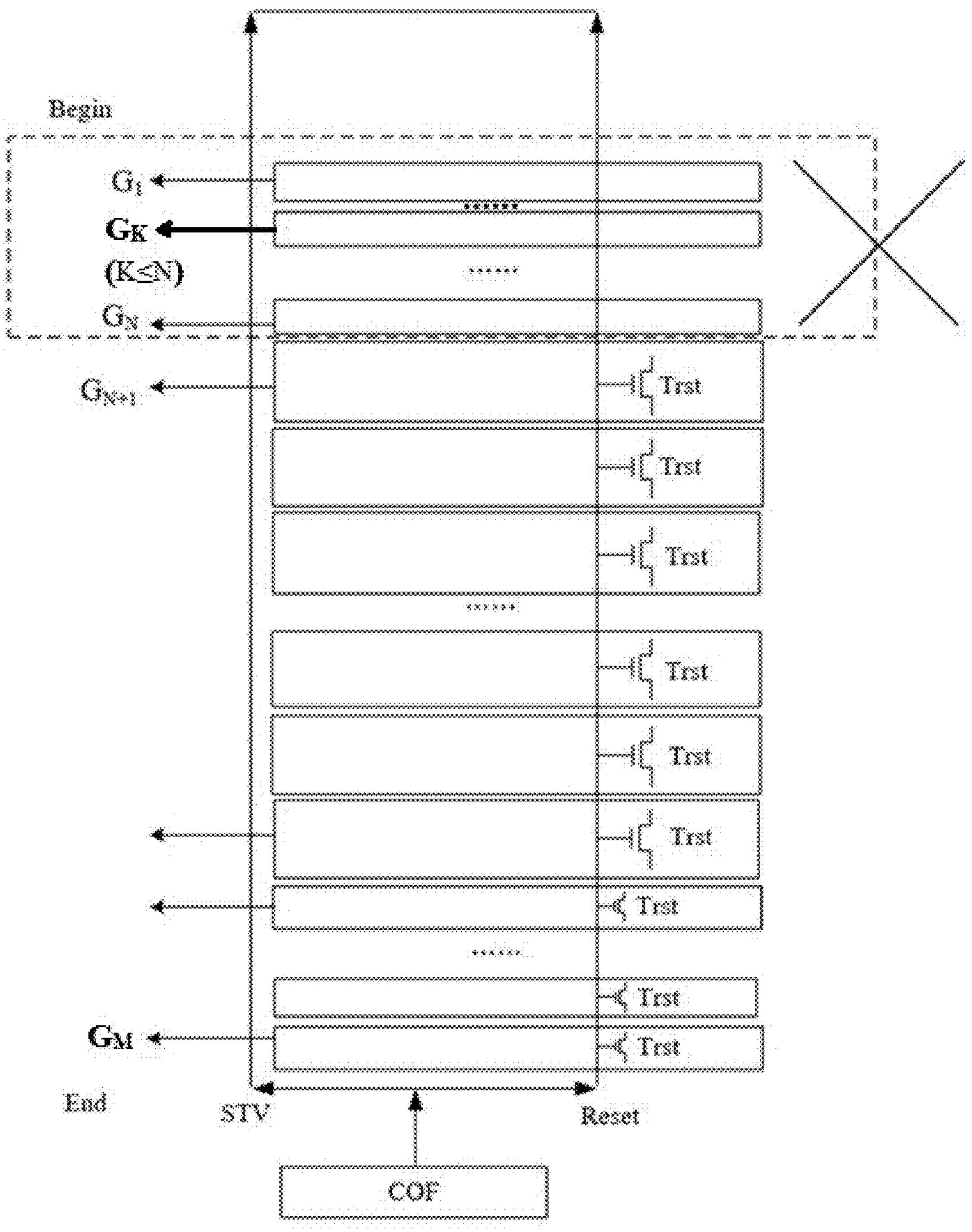
FIG. 3 is a schematic diagram illustrating the scanning of a GOA circuit in a cut display panel according to an embodiment of the present application.

In order to meet a demand of implementing custom resolution in present display panels, a laser re-cut method is usually employed. As shown in FIG. 3, a GOA display panel with a required size is obtained by second cutting on the GOA display panel after a first cut. As shown in FIG. 3, based on the GOA display panel in reverse scanning mode, a portion of the GOA display panel including the first-end GOA unit will be cut during the second cutting (as shown in the dashed box in FIG. 3), and there is a reset transistor Trst provided on the reset wiring of the first-end GOA unit of the cut display panel. The level of the first node Q(N) will be pulled down when the reset transistor Trst is turned on, and this leads to the first node Q(N) of the first-end GOA unit of the cut display panel being ineffectively charged, affecting the display effect.

The current solution is to laser-disconnect the drain of the first N-stage Trst of the cut display panel, thereby disconnecting the drain of the first N-stage Trst from the low level voltage signal VSSQ. Thus, the first N-stage Trst cannot be turned on normally so as to avoid the first N stages of the first node Q(N) from being ineffectively charged. However, the current solution includes cutting at N places, which leads to a heavy workload, and meanwhile, the drain electrode of the first N-stage Trst is difficult to cut due to a small size of the reset transistors Trst, which can easily result in cutting the other wirings and thereby decreasing the yield of the cut bar screen.

Figure 4:
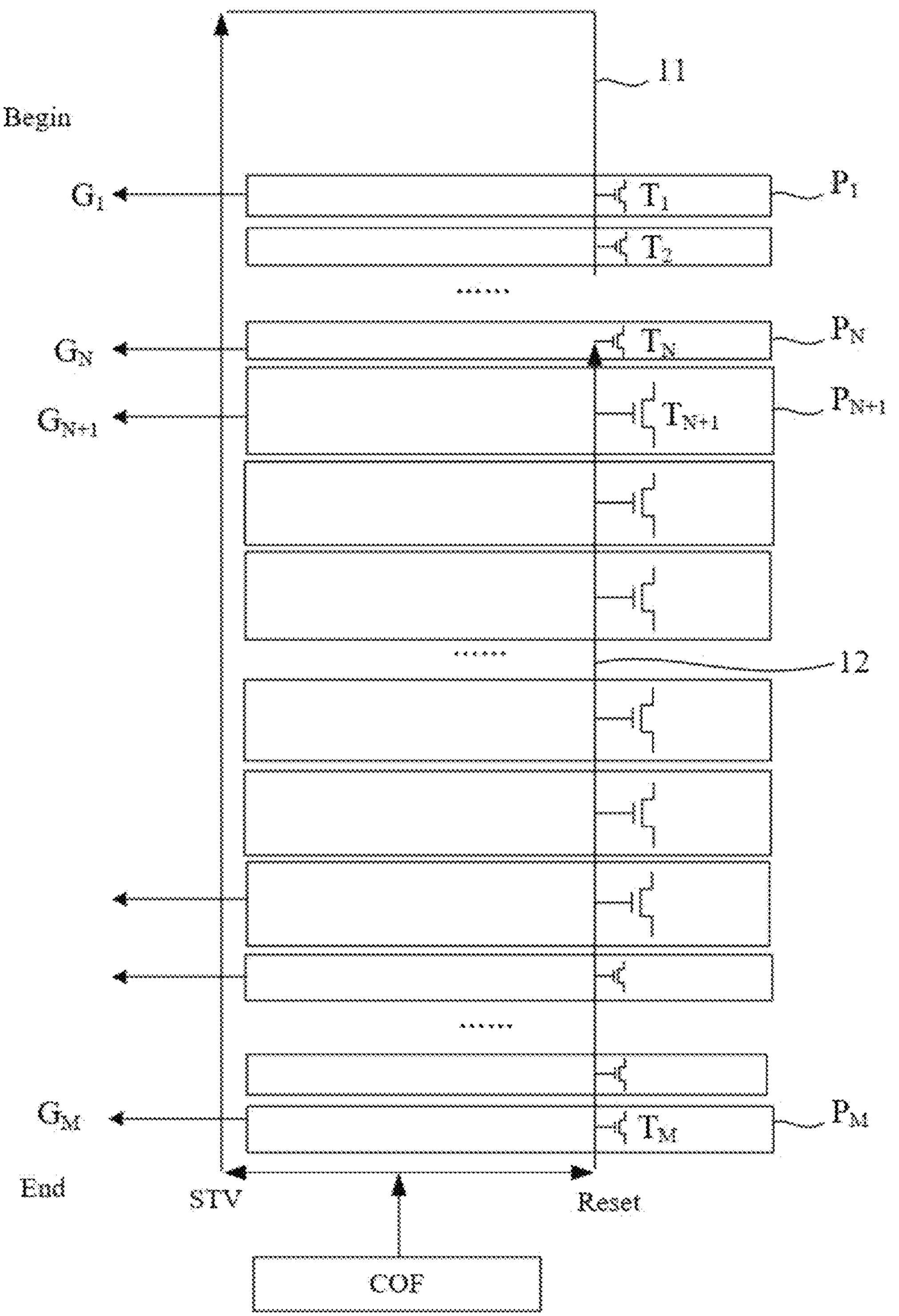
FIG. 4 is a schematic diagram of a structure of a display panel according to an embodiment of the present application.

To solve the aforementioned issues, a display panel is provided in an embodiment of the present application. As shown in FIG. 4, a display panel 10 includes: M rows of pixels $P_1$ to $P_M$; and M cascaded gate drive circuits $G_1$ to $G_M$, each of the gate drive circuits being connected to a row of the pixels.

Each of the gate drive circuits comprises a reset transistor ($T_1$ to $T_M$). The gate electrodes of K reset transistors ($T_1$ to $T_K$) arranged successively are connected to a first metal wiring 11, the gate electrodes of M−K reset transistors ($T_{K+1}$ to $T_M$) arranged successively are connected to a reset signal line 12, and the first metal wiring 11 and the reset signal line 12 are in a disconnection state, where M and K are positive integers, and K<M.

It should be noted that M represents a number of rows of pixels existing on the display panel after cutting. At the time of actual use, the gate drive scan can be performed in the sequence from the first row to the $M^{th}$ row, or in the sequence from the $M^{th}$ row to the first row. The embodiments of the present application do not impose such limitations.

In the display panel provided by the embodiments of the present application, the gate electrodes of K reset transistors arranged successively and the gate electrodes of the other reset transistors are in a disconnection state. These other reset transistors are each connected to the reset signal line 12, respectively, while the K reset transistors arranged successively are not connected to the reset signal line 12. If the first metal wiring 11 and the reset signal line 12 are disposed as a same wiring, a single cut is enough. At least the existing technical problem of low cutting efficiency and low panel yield due to a large number of cuts for the connection between the drain of the N reset transistors and the signal line at a preset low voltage level is solved. The panel structure provided in the embodiment of the present application can be achieved with a single cut, effectively enhancing the panel cutting efficiency and the yield rate of the panels.

The driving principle of the GOA circuit is similar to a principle of a shift register. A high level voltage signal is outputted when a scan line is turned on, and a low level voltage signal is outputted when the scan line is not turned on. The GOA units are connected in a cascading manner, where the output signal of one row serves both as a reset signal for the previous row and as an input signal for the next row. In the design of the GOA circuit, a design with a multi-CLK signal line, such as a 4 CLK signal line design, a 6 CLK signal line design, or a 8 CLK signal line design, is commonly employed to solve the attenuation problem of the clock signal (CLK) during a transport of a large-size panel and to reduce the load and enhance efficiency.

In one embodiment, every N cascaded gate drive circuits along a scanning direction of the pixels from top to bottom form a group. K reset transistors arranged successively belong to a first group of gate drive circuits. N represents the number of drive clock signals corresponding to the display panel 10, where K≤N, and M is an integer multiple of N.

For example, in the design of a GOA circuit with 4 CLK signal lines, N is 4, and the first four GOA circuits can be considered as the first-end GOA unit. In the design of a GOA circuit with 6 CLK signal lines, N is 6, and the first six GOA circuits can be considered as the first-end GOA unit.

In an embodiment of the present application, an exemplary explanation is provided for the gate drive scan from the first row to the $M^{th}$ row.

In one embodiment of the present application, the first metal wiring 11 is arranged at a same layer and made of a same material as the reset signal line 12. That is, the first metal wiring 11 and the reset signal line 12 are located at the same layer and made of the same material. The first metal wiring 11 and the reset signal line 12 can be a same metal wiring, which is disconnected at a specific location. The disconnection can be achieved by laser cutting or other panel processes to break a metal layer.

Figure 5:
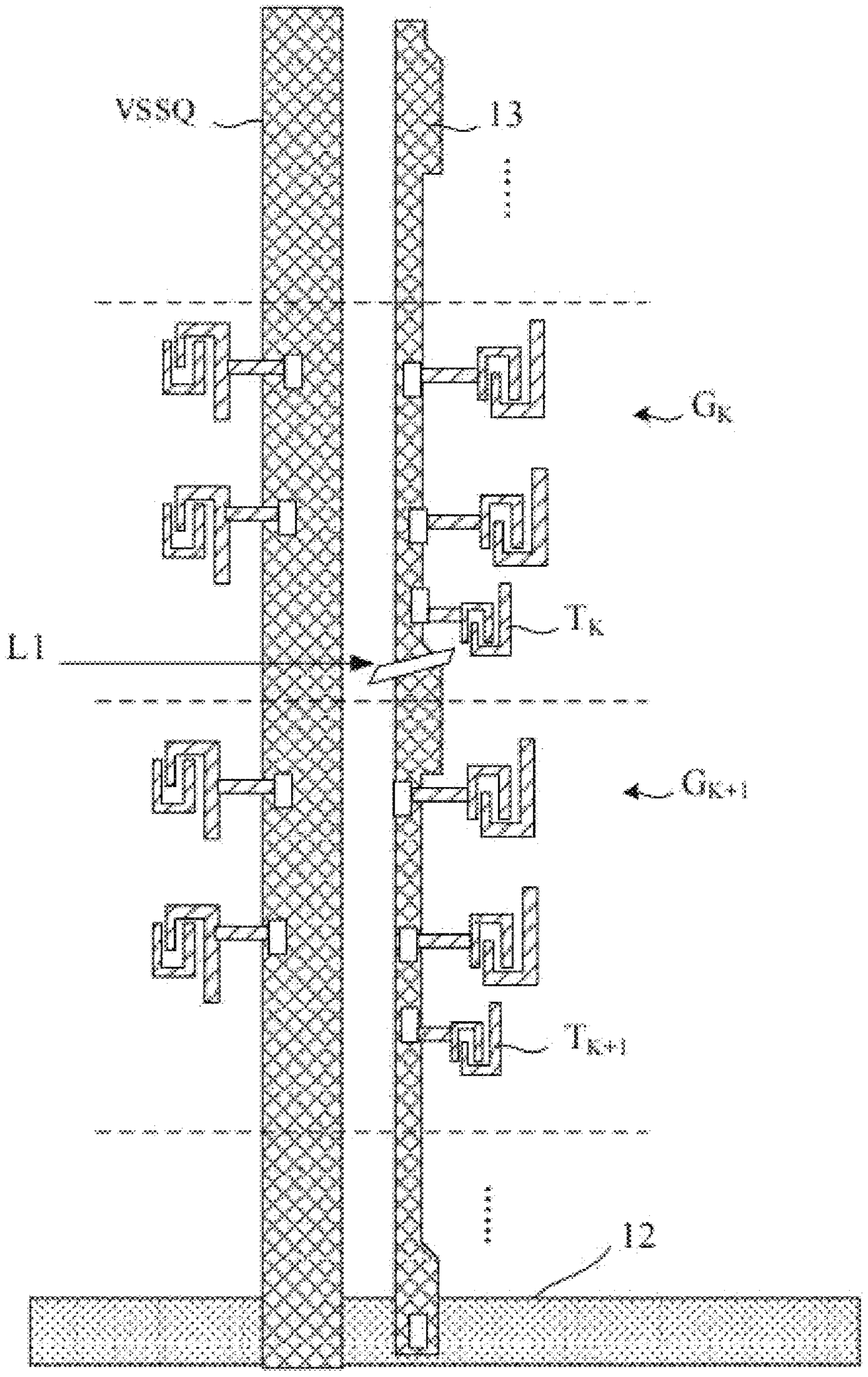
FIG. 5 is a schematic diagram illustrating the cutting of a display panel according to an embodiment of the present application.

As shown in FIG. 5, in one example embodiment, an optional structure of the display panel 10 is: a second metal wiring 13 is common to the gate electrodes of M reset transistors, a reset signal line 12 is disposed on a side close to the $M^{th}$ reset transistor, and the second metal wiring 13 is connected to the reset signal line 12. The second metal wiring 13 is in a disconnection state at a position between the $K^{th}$ reset transistor $T_K$ and the $(K+1)^{th}$ reset transistor $T_{K+1}$, as shown in FIG. 5 by L1.

In the embodiment as shown in FIG. 5, the second metal wiring 13 goes through the entire display panel 10 along the row scanning direction, and the gate electrodes of M reset transistors are all formed in the metal layer where the second metal wiring 13 is located. The reset signal line 12 is disposed at the bottom of the display panel 10, namely below the $M^{th}$ row of pixels, which can also be understood as below the $M^{th}$ GOA unit. The second metal wiring 13 can be connected to the reset signal line 12 through a via hole, and therefore, the M reset transistors can receive a reset signal through the reset signal line 12. The transmission direction of the reset signal is conducted from the bottom to top.

The second metal wiring 13 is in a disconnection state at a position between the $K^{th}$ reset transistor $T_K$ and the $(K+1)^{th}$ reset transistor $T_{K+1}$ such that the reset transistors of the first-end GOA unit on the cut portion of the display panel 10 will not operate. The reset signals will not be acquired by the first K reset transistors, and these reset transistors will not work properly.

It should be noted that K can be any positive integer less than N. If K is 1, then the first reset transistor $T_1$ will not work properly, allowing for the normal charging of Q(1). If K is 2, the first two reset transistors ($T_1$ and $T_2$) will not work properly, allowing for the normal charging of Q(1) and Q(2). The embodiments of the present application do not specify a particular value for K, only providing an example implementation method. In the example implementation method, the closer the value of K is to N, the better the charging effect of the first-end GOA unit.

In an embodiment of the present application, if N is 6, namely K is an integer that is less than or equal to 6. For example, K can be 2, 3, 4, or 5, and K can also be equal to 6, as long as it is possible to make at least two Q points charge properly.

In the display panel provided by an embodiment of the present application, the gate electrodes of K reset transistors arranged successively and the gate electrodes of the other reset transistors are in a disconnection state. These other reset transistors are each connected to a reset signal line 12, respectively, while the K reset transistors arranged successively are not connected to the reset signal line 12. If the first metal wiring 11 and the reset signal line 12 are disposed as a same wiring, a single cut is enough. At least the existing technical problem of low cutting efficiency and low panel yield due to a large number of cuts for the connection between the drain of the N reset transistors and the signal line at a preset low voltage level is solved. The panel structure provided in the embodiment of the present application can be achieved with a single cut, effectively enhancing the panel cutting efficiency and the yield rate of the panels.

If a gate signal of the first N/2 stage reset transistors is disconnected, the first N/2 stage reset transistors cannot operate normally, avoiding the first node Q(N) of the first N/2 stages from being ineffectively charged. If the display row of the $N^{th}$ row needs to be cut, the wiring can be severed through laser or other cutting methods, thereby disconnecting the gate signals of the first N-level reset transistors, enabling the first N-level reset transistors to be inoperative, and thus avoiding the first N-level Q(N) from being ineffectively charged. Regardless of which row is cut, only one position of the second metal wiring 13 needs to be cut, which is simple and efficient, reducing the cutting workload and improving the re-cut yield and display effect of the GOA display panel.

Figure 6:
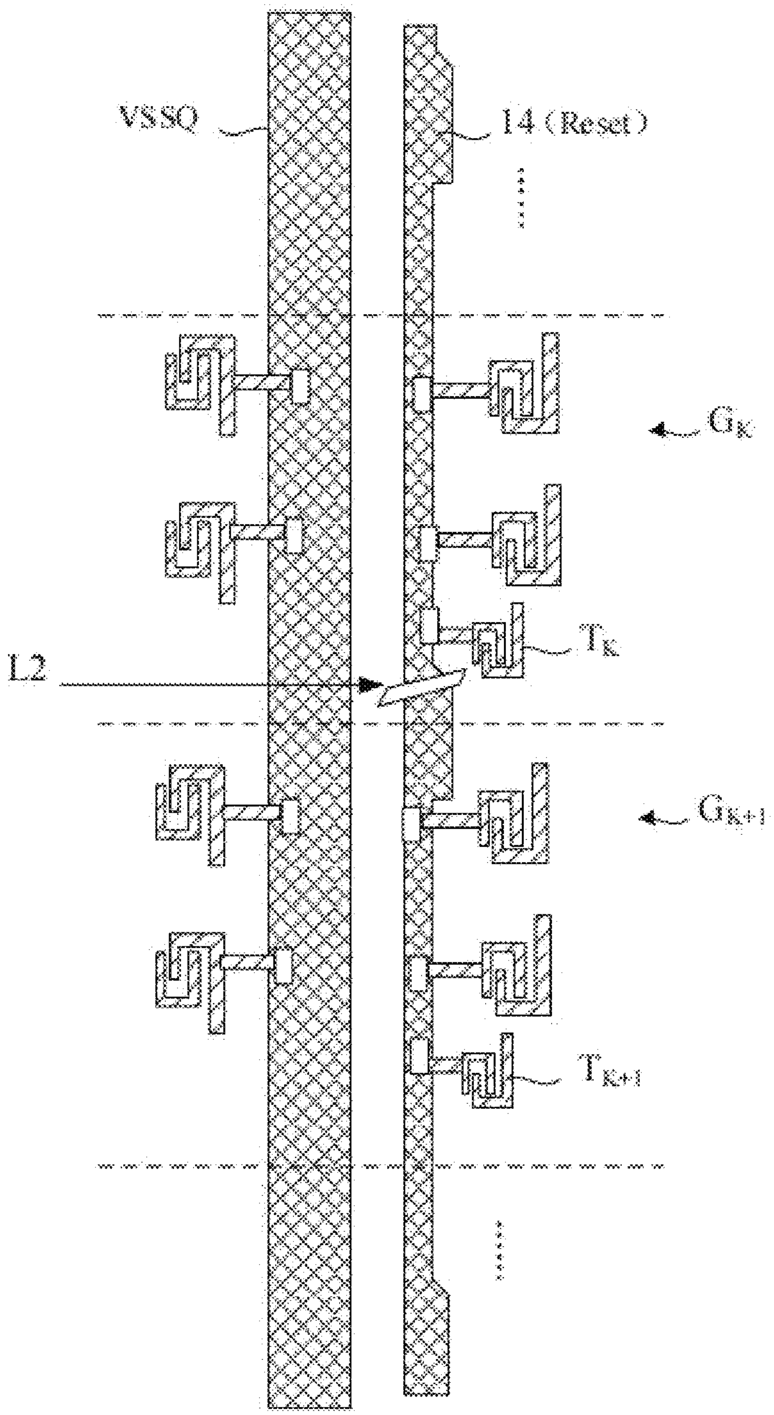
FIG. 6 is a schematic diagram illustrating the cutting of another display panel according to an embodiment of the present application.

As shown in FIG. 6, in an example embodiment, an optional structure of the display panel 10 is: a first metal wiring 11 and a reset signal line 12 belong to a third metal wiring 14, and the third metal wiring 14 is in a disconnection state at the position corresponding to the $K^{th}$ reset transistor $T_K$, as shown in FIG. 6 by L2.

In the panel structure as shown in FIG. 6, the first metal wiring 11 and the reset signal line 12 are formed as a same metal wiring, namely the third metal wiring 14. It can be understood that the gate electrodes of M reset transistors are connected to the third metal wiring 14 after one cutting of the display panel 10. At this point, the third metal wiring 14 is formed as the reset signal line for the entire display panel 10. In the panel structure as shown in FIG. 6, the reset signal line (that is, the third metal wiring 14) goes through the entire display panel 10 along the row scanning direction of the display panel 10 from top to bottom, and the third metal wiring 14 at a position of the $K^{th}$ reset transistor $T_K$ is disconnected after second cutting. That is, the third metal wiring 14 is divided into the first metal wiring 11 and the reset signal line 12 via the second cutting. The reset signal is directly inputted into the third metal wiring 14, which is the reset signal line. The transmission direction of the reset signal is conducted from the bottom to top. That is, propagation is from the $M^{th}$ reset transistor $T_M$ towards the first reset transistor $T_1$.

In one embodiment, the third metal wiring 14 is disconnected at the position of the $K^{th}$ reset transistor $T_K$. It can be that the third metal wiring 14 at a position between the gate electrodes of the $K^{th}$ reset transistor $T_K$ and the gate electrodes of the $(K+1)^{th}$ reset transistor $T_{K+1}$ is disconnected.

The third metal wiring 14 is in a disconnection state at a position between the $K^{th}$ reset transistor $T_K$ and the $(K+1)^{th}$ reset transistor $T_{K+1}$ such that the reset transistors of the first-end GOA unit on the cut portion of the display panel 10 will not operate. Consequently, the reset signals will not be acquired by the first K reset transistors, and these reset transistors will not work properly.

It should be noted that K can be any positive integer less than N. If K is 1, then the first reset transistor $T_1$ will not work properly, allowing for the normal charging of Q(1). If K is 2, the first two reset transistors ($T_1$ and $T_2$) will not work properly, allowing for the normal charging of Q(1) and Q(2). The embodiment of the present application does not specify a particular value for K, only providing an example implementation method, in which the closer the value of K is to N, the better the charging effect of the first-end GOA unit.

In an embodiment, if N is 8, namely K is an integer that is less than or equal to 8. For example, K can be 2, 3, 4, 5, 6, or 7, and K can also be equal to 8, as long as it is possible to make at least two Q points charge properly.

In the display panel provided by an embodiment of the present application, the gate electrodes of K reset transistors arranged successively and the gate electrodes of the other reset transistors are in a disconnection state. These other reset transistors are each connected to the reset signal line 12, respectively, while the K reset transistors arranged successively are not connected to the reset signal line 12. If the first metal wiring 11 and the reset signal line 12 are disposed as a same wiring, namely, the third metal wiring 13, a single cut of the third metal wiring 13 is enough, and at least the existing technical problem of low cutting efficiency and low panel yield due to a large number of cuts for the connection between the drain of the N reset transistors and the signal line at a preset low voltage level is solved. The panel structure provided in the embodiment of the present application can be achieved with a single cut, effectively enhancing the panel cutting efficiency and the yield rate of the panels.

If a gate signal of the first N/2 stage reset transistors is disconnected, then the first N/2 stage reset transistors cannot operate normally, avoiding the first node Q(N) of the first N/2 stages from being ineffectively charged. If the display row of the Nth row needs to be cut, the wiring can be severed through laser or other cutting methods, thereby disconnecting the gate signals of the first N-level reset transistors, enabling the first N-level reset transistors to be inoperative, and thus avoiding the first N-level Q(N) from being ineffectively charged. Regardless of which row is cut, only one position of the third metal wiring 14 needs to be cut, which is simple and efficient, reducing the cutting workload and improving the re-cut yield and display effect of the GOA display panel.

Figure 7:
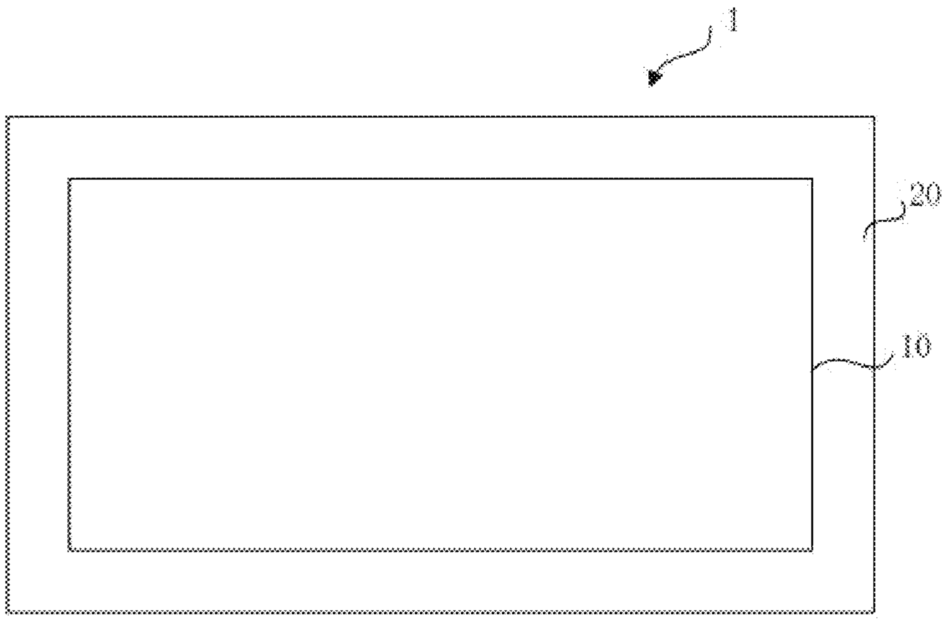
FIG. 7 is a schematic diagram of a structure of a display terminal according to an embodiment of the present application.

As shown in FIG. 7, a display terminal 1 provided in another embodiment of the present application comprises a display panel 10 as described in any one of the above embodiments and a terminal body 20. The display panel 10 and the terminal body 20 are combined integrally. The terminal body 20 may include a backlight module, which is disposed on a side of a substrate of the display panel 10 that is away from the GOA circuit of the display panel 10. The backlight module is used to provide a light source for the display panel 10.

The display terminal 1 can be any of the following: mobile phone, tablet computer, television, monitor, notebook computer, digital photo frame, navigator, or any other products or parts with a display function.

In this text, specific examples have been used to elucidate the principles and implementation methods of the present application. The descriptions of the aforementioned embodiments serve only to assist in understanding the methods and core ideas of the present application. Concurrently, for technical personnel in this field, there will be variations in the specific implementation methods and the scope of application based on the concepts of the present application. In summary, the content of this specification should not be construed as limiting the scope of the present application.

What is claimed is:

1. A display panel, comprising:

M rows of pixels; and

M cascaded gate drive circuits, each of the gate drive circuits being connected to a row of the pixels, and each of the gate drive circuits comprising a reset transistor;

wherein gate electrodes of K reset transistors arranged successively are connected to a first metal wiring, gate electrodes of M-K reset transistors arranged successively are connected to a reset signal line, and the first metal wiring and the reset signal line are in a disconnection state, where M and K are positive integers, and K<M;

wherein every N cascaded gate drive circuits form a group along a scanning direction of pixels from top to bottom, wherein the K reset transistors arranged successively belong to a first group of the gate drive circuits, N represents a number of drive clock signals corresponding to the display panel, K≤N, and M is an integer multiple of N;

wherein a second metal wiring is common to the gate electrodes of M reset transistors, the reset signal line is disposed on a side close to an $M^{th}$ reset transistor, and the second metal wiring is connected to the reset signal line;

wherein the second metal wiring is in a disconnection state at a position between a $K^{th}$ reset transistor and a $(K+1)^{th}$ reset transistor.

2. The display panel according to claim 1, wherein the first metal wiring is arranged at a same layer and made of a same material as the reset signal line.

3. The display panel according to claim 1, wherein the first metal wiring and the reset signal line belong to a third metal wiring, and the third metal wiring is in a disconnection state at a position corresponding to a $K^{th}$ reset transistor.

4. The display panel according to claim 3, wherein the third metal wiring is in a disconnection state at a position between a gate electrode of the $K^{th}$ reset transistor and a gate electrode of a $(K+1)^{th}$ reset transistor.

5. The display panel according to claim 1, wherein K=N/2.

6. The display panel according to claim 1, wherein K=N.

7. A display terminal, comprising a display panel, wherein the display panel comprises:

M rows of pixels; and

M cascaded gate drive circuits, each of the gate drive circuits being connected to a row of the pixels, and each of gate drive circuits comprising a reset transistor;

wherein gate electrodes of K reset transistors arranged successively are connected to a first metal wiring, gate electrodes of M-K reset transistors arranged successively are connected to a reset signal line, and the first metal wiring and the reset signal line are in a disconnection state, where M and K are positive integers, and K<M;

wherein every N cascaded gate drive circuits form a group along a scanning direction of pixels from top to bottom, wherein the K reset transistors arranged successively belong to a first group of the gate drive circuits, N represents a number of drive clock signals corresponding to the display panel, K≤N, and M is an integer multiple of N;

wherein a second metal wiring is common to the gate electrodes of M reset transistors, the reset signal line is disposed on a side close to an $M^{th}$ reset transistor, and the second metal wiring is connected to the reset signal line;

wherein the second metal wiring is in a disconnection state at a position between a $K^{th}$ reset transistor and a $(K+1)^{th}$ reset transistor.

8. The display terminal according to claim 7, wherein the first metal wiring is arranged at a same layer and made of a same material as the reset signal line.

9. The display terminal according to claim 7, wherein the first metal wiring and the reset signal line belong to a third metal wiring, and the third metal wiring is in a disconnection state at a position corresponding to a $K^{th}$ reset transistor.

10. The display terminal according to claim 9, wherein the third metal wiring is in a disconnection state at a position between a gate electrode of the $K^{th}$ reset transistor and a gate electrode of a $(K+1)^{th}$ reset transistor.

11. The display terminal according to claim 7, wherein K=N/2.

12. The display terminal according to claim 7, wherein K=N.

* * * * *